United States Patent
Knappmann et al.

(10) Patent No.: US 8,027,241 B2
(45) Date of Patent: Sep. 27, 2011

(54) OPTICAL STORAGE MEDIUM, MASTERING METHOD AND APPARATUS FOR READING OF RESPECTIVE DATA

(75) Inventors: Stephan Knappmann, Zimmern ob Rottweil (DE); Michael Krause, Villingen-Schwenningen (DE); Stefan Kimmelmann, Pfaffenweiler (DE)

(73) Assignee: Thomson Licensing, Princeton, NJ (US)

(*) Notice: Subject to any disclaimer, the term of this patent is extended or adjusted under 35 U.S.C. 154(b) by 0 days.

(21) Appl. No.: 12/735,730

(22) PCT Filed: Feb. 10, 2009

(86) PCT No.: PCT/EP2009/051491
§ 371 (c)(1),
(2), (4) Date: Aug. 12, 2010

(87) PCT Pub. No.: WO2009/101072
PCT Pub. Date: Aug. 20, 2009

(65) Prior Publication Data
US 2010/0315932 A1    Dec. 16, 2010

(30) Foreign Application Priority Data
Feb. 13, 2008  (EP) .................................. 08101605

(51) Int. Cl.
*G11B 7/24* (2006.01)

(52) U.S. Cl. .................. 369/275.3; 369/275.4; 369/283
(58) Field of Classification Search ........................ None
See application file for complete search history.

(56) References Cited

U.S. PATENT DOCUMENTS

| 5,818,811 A | 10/1998 | Fujii |
| 2004/0042357 A1 | 3/2004 | Nagura et al. |
| 2004/0257968 A1 | 12/2004 | Kim et al. |

FOREIGN PATENT DOCUMENTS

| JP | 04111236 | 4/1992 |
| WO | WO2004032123 | 4/2004 |
| WO | WO2005081242 | 9/2005 |

OTHER PUBLICATIONS

Tominaga et al., "The Near-Field Super-Resolution Properties of an Antimony Thin Film", Japanese Journal of Applied Physics, vol. 37, No. 11A, Nov. 1998, pp. L1323-L1325.
Search Report Dated August 3, 2009.

*Primary Examiner* — Paul Huber
(74) *Attorney, Agent, or Firm* — Tutunjian & Bitetto, P.C.

(57) ABSTRACT

The optical storage medium comprises a substrate layer, and a data layer having a mark/space data structure with data arranged in tracks on the substrate layer, , wherein between neighboring tracks alternatingly a groove section or a land section without a groove is arranged. The tracks, groove sections and land sections may be arranged by providing a single spiral, two spirals, or four spirals on the optical storage medium. The optical storage medium is in particular an optical disc comprising a nonlinear layer with a super-resolution structure arranged above the data layer.

17 Claims, 6 Drawing Sheets

|  | Pit | land | Groove | land | Pit | land | Pit |
|---|---|---|---|---|---|---|---|
| 1 | 60nm | 40nm | 60nm | 40nm | 60nm | 140nm | 60nm |
|  | pit to pit track pitch = 200nm ||||||||
|  | groove to groove track pitch = 400nm |||||||
| 2 | 72nm | 48nm | 72nm | 48nm | 72nm | 168nm | 72nm |
|  | pit to pit track pitch = 240nm |||||||
|  | groove to groove track pitch = 480nm |||||||
| 3 | 84nm | 56nm | 84nm | 56nm | 84nm | 196nm | 84nm |
|  | pit to pit track pitch = 280nm |||||||
|  | groove to groove track pitch = 560nm |||||||

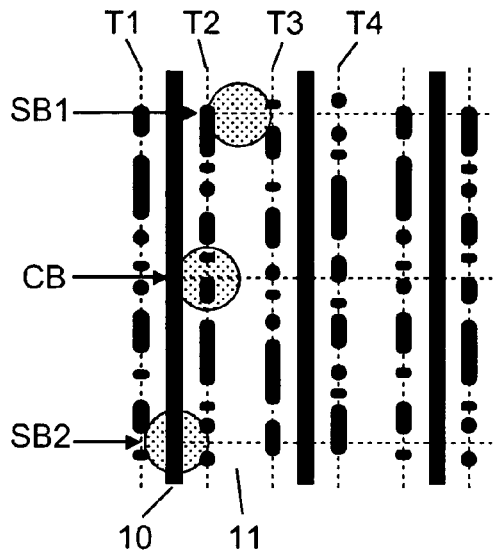
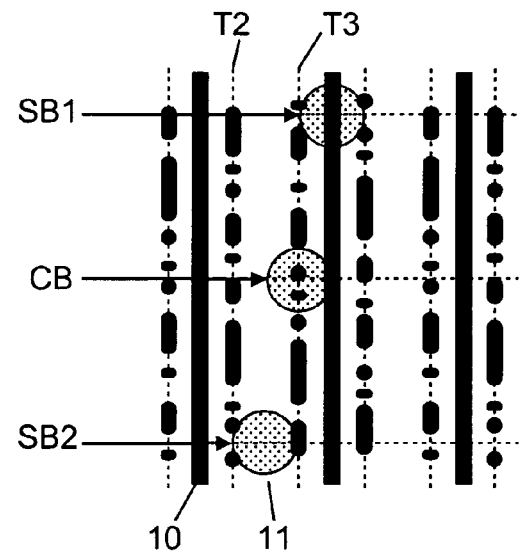
Fig. 4a    Fig. 4b
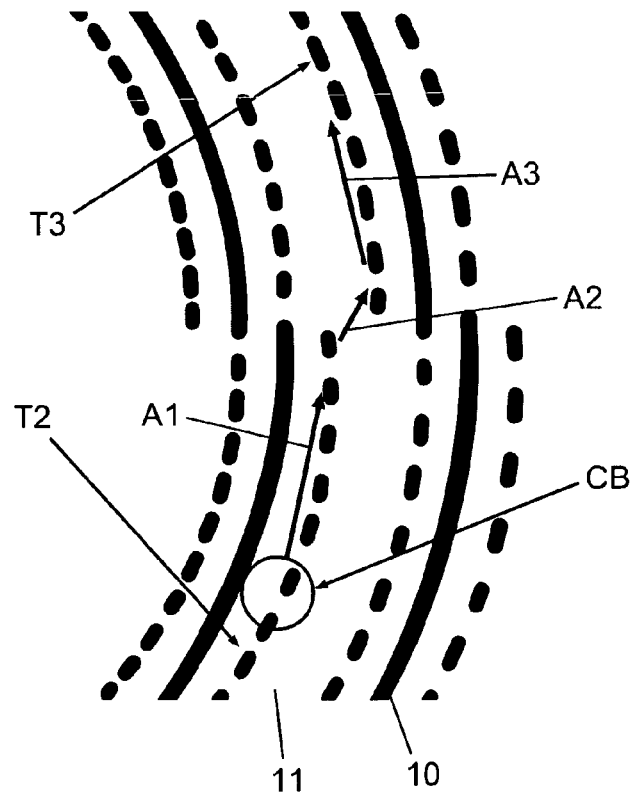
Fig. 5

OPTICAL STORAGE MEDIUM, MASTERING METHOD AND APPARATUS FOR READING OF RESPECTIVE DATA

This application claims the benefit, under 35 U.S.C. §365 of International Application PCT/EP2009/051491, filed Feb. 10, 2009, which was published in accordance with PCT Article 21(2) on Aug. 20, 2009 in English and which claims the benefit of European patent application No. 08101605.7, filed Feb. 13, 2008.

TECHNICAL FIELD OF THE INVENTION

The present invention relates to an optical storage medium comprising a substrate layer and a data layer having a mark/space data structure with data arranged in tracks on the substrate layer. The invention relates further to a method for manufacturing a master for a production of the optical storage medium and to an apparatus for reading data on the optical storage medium.

BACKGROUND OF THE INVENTION

Optical storage media are media in which data are stored in an optically readable manner, for example by means of a laser and an optical detector, for example a photodetector, being integrated within a pickup. The detector is used for detecting reflected light of the laser beam when reading data on the storage medium. In the meanwhile a large variety of optical storage media are known, which are operated with different laser wavelength, and which have different sizes for providing storage capacities from below one Gigabyte up to 50 Gigabyte (GB). The formats include read-only formats such as Audio CD and Video DVD, write-once optical media such as CD-R and DVD-R, DVD+R, as well as rewritable formats like CD-RW, DVD-RW and DVD+RW. Digital data are stored on these media along tracks in one or more layers of the media.

The storage medium with the highest data capacity is at present the Blu-Ray disc (BD), which allows to store up to about 50 GB on a dual layer disc. For reading and writing of a Blu-Ray disc an optical pickup with a laser wavelength of 405 nm and a numerical aperture of 0,85 is used. On the Blu-Ray disc a track pitch of 320 nm and a mark length from 2 T to 8 T or 9 T is used, where T is the channel bit length and wherein 2 T corresponds with a minimum mark length of 138-160 nm.

New optical storage media with a super-resolution structure offer the possibility to increase the data density of the optical storage medium by a factor of two to four in one dimension as compared with the Blu-Ray disc. This is possible by including a nonlinear layer, which is placed above a data layer of the optical storage medium, and which significantly reduces the effective size of a light spot used for reading from or writing to the optical storage medium. The non-linear layer can be understood as a mask layer because it is arranged above the data layer and for some specific materials only the high intensity center part of a laser beam can penetrate the mask layer. Further, semiconductor materials can be used as a nonlinear layer, e.g. InSb, which show a higher reflectivity in the center part of the focused laser beam, and for which the center reflectivity is dependent on the pit structure of the corresponding data layer.

Therefore, the super-resolution effect allows to record and read data stored in marks of an optical disc, which have a size below the diffraction limit of a corresponding optical pickup. The diffraction limit of a Blu-Ray type pickup having a laser wavelength $\lambda=405$ nm and a numerical aperture NA=0,85 is about $\lambda/2NA=238$ nm. The nonlinear layer is often called a super-resolution near-field structure (Super-RENS) layer because it is assumed that for some specific materials, the optical effect of reducing the effective spot size of the laser beam is based on a near-field interaction between the marks and spaces of the data layer and the nonlinear layer. A Super-RENS optical disc comprising a super resolution near-field structure formed of a metal oxide, a polymer compound or a phase change layer comprising a GeSbTe or a AgInSbTe structure for recording of data and reproducing of data is known from WO 2005/081242 and U.S. 2004/0257968. Further examples of super-resolution optical media are described in WO 2004/032123.

BRIEF SUMMARY OF THE INVENTION

The optical storage medium comprises a substrate layer and a data layer having a mark/space data structure with data arranged in tracks on the substrate layer, wherein between neighboring tracks alternatingly a groove section or a land section is arranged. The optical storage medium is in particular an optical disc, on which the tracks, groove sections and land sections are arranged for providing in radial direction of the disc a consecutive sequence of alternatingly a track, a groove section, a track, a land section, a track, and so on. Neighboring tracks with data are therefore separated by either a groove section or a land section. The groove section comprises a groove with a defined depth and width, and the land section is just a flat area between neighboring tracks, without any groove. The optical storage medium may comprise further a non-linear layer with a super-resolution near field structure disposed on the data layer.

The optical storage medium is in an aspect of the invention a ROM disc, comprising pits and lands the as marks and spaces, the pits being molded or embossed on the surface of the substrate. In addition to a reduced pit size, for which the super-resolution effect is required for reading of the data, advantageously a reduced track pitch is utilized, to provide a ROM disc with a high data density. The reduced track pitch between neighboring tracks is below the optical diffraction limit of a corresponding optical pickup. The distance between two neighboring groove sections is kept above the optical resolution limit of the pickup, so that a differential push-pull tracking signal can be generated by utilizing diffracted light of the neighboring groove and land sections, when reading data of a respective track.

In accordance with a first embodiment of the invention, the optical storage medium is an optical disc comprising a single spiral with track sections, groove sections and land sections such to provide in radial direction of the disc a consecutive sequence of alternatingly a track, a groove, a track, and a land section. Each track, groove section and land section has in particular a length corresponding with a circumference of 360° of the optical disc.

In a second embodiment, the optical disc comprises a single spiral of continuous data and a second spiral comprising alternatively a groove section and a land section, wherein the two spirals are interleaved with each other to provide in radial direction of the disc a consecutive sequence of alternatingly a track, a groove section, a track and a land section. Each groove and land section has in particular a length corresponding with a circumference of 360° of the optical disc.

In a third embodiment, the tracks are arranged as two spirals of continuous data, the groove sections are arranged as a third spiral and the land sections are arranged as a fourth spiral, the four spirals being interleaved with each other to provide in radial direction of the disc a consecutive sequence of alternatingly a track, a groove section, a track and a land section.

A mastering of a stamper for a production of an optical disc in accordance with the first embodiment can be made by using an electron beam or a laser beam as a mastering beam for producing of a single spiral comprising alternatingly a track with continuous data, a groove section and a land section. The track with data is mastered by switching the intensity of the mastering beam on and off for writing of corresponding marks and spaces, the groove section is mastered by keeping the intensity of the mastering beam switched on and the land section is mastered by keeping the intensity of the mastering beam switched off. For writing the tracks and groove sections and for providing the land sections, a constant radial feed is used. The spirals of the second and third embodiment can be mastered accordingly, however requiring a two beam mastering system for the second embodiment and a three beam mastering system for the third embodiment.

An apparatus for reading data on the optical storage medium comprises a pickup with a laser, a detector unit and an objective lens, the pickup generating a main beam for reading of data and generating two satellite beams for providing a tracking signal. The three beams are focused by the objective lens onto the optical storage medium and the reflected light from the optical storage medium is guided onto the detector unit within the pickup. The detector unit comprises a center detector for detecting reflected light from the main beam and two satellite detectors for detecting reflected light from the satellite beams, as reflected from the optical storage medium.

The two satellite beams are adjusted in particular such, that one is exactly centered on a groove section and the other one exactly centered on a land section, when the center beam is adjusted to a track section. The detector unit provides a differential push-pull tracking signal according to the two satellite detectors for a tracking regulation. When a groove section changes to a land section or a land section changes to a groove section, the sign of the tracking signal is changed accordingly.

For the two satellite beams advantageously a light intensity is used, which is much lower than the light intensity of the center beam, because no super-resolution effect is required for obtaining a differential push-pull signal from the land sections and groove sections. The smallest possible track pitch will be in a range between 160 nm and 200 nm, when using a pickup having Blu-Ray type optics with lambda =405 nm and a numerical aperture of 0,85. Therefore, an increase in data density by a factor of 1,5 to 2 can be obtained with regard to a track pitch of 320 nm, as used for present Blu-Ray discs. The invention has the further advantage that only minor modifications have to be made for a Blu-Ray type pickup for reading of an optical storage medium in accordance with the present invention.

BRIEF DESCRIPTION OF THE DRAWINGS

Preferred embodiments of the invention are explained now in more detail below by way of example with reference to schematic drawings, which show.

DETAILED DESCRIPTION OF PREFERRED EMBODIMENTS

Figure 1:
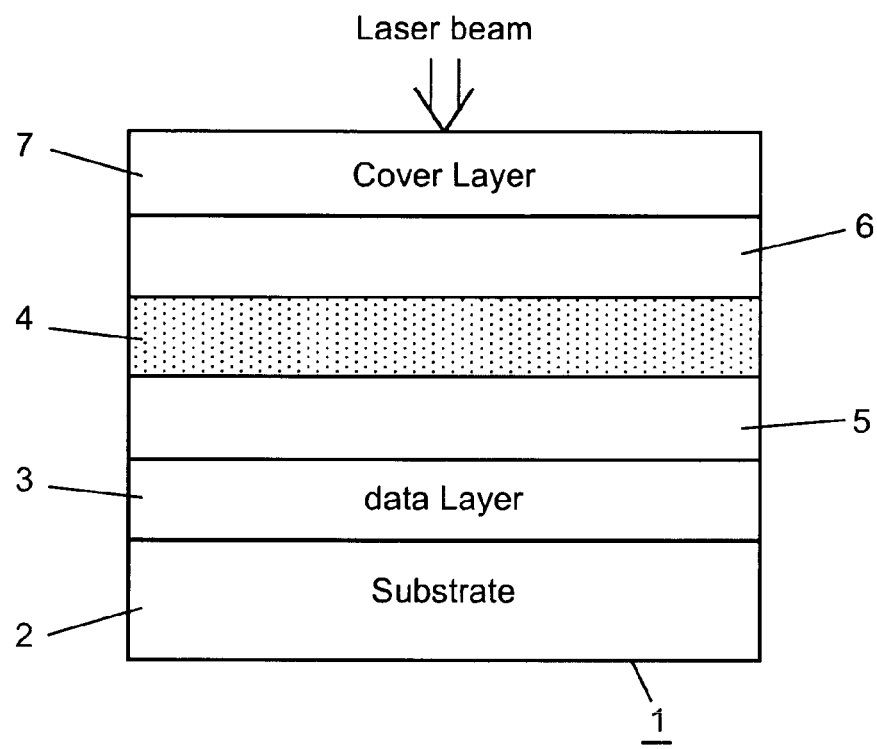
FIG. 1 an optical storage medium with a layer stack comprising a substrate, a data layer and a non-linear layer in a sectional view, FIG. 2 a track structure according to a first embodiment of the optical storage medium of FIG. 1, FIG. 3 a table showing optimized dimensions for the track structure of FIG. 2, FIGS. 4a, 4b tracking of a pickup on two different tracks of the track structure of FIG. 2, FIG. 5 illustration of a track transition from a second to a third track, FIG. 6 an optical detector arrangement of a pickup, FIG. 7 push-pull signals of a pickup before and after a track transition, FIGS. 8a, 8b two alternative track structures according to a second embodiment of the optical storage medium of FIG. 1, and FIG. 9a, 9b two alternative track structures according to a third embodiment of the optical storage medium of FIG. 1.

In FIG. 1 an optical storage medium 1 is shown in a cross section in a simplified manner. The optical storage medium 1 is for example a read-only (ROM) optical storage disc. On a substrate 2 a data layer 3 is arranged which may comprise a reflective metallic layer, for example an aluminum layer. The data layer 3 has a data structure consisting of marks and spaces arranged on essentially parallel tracks. In the case of a ROM disc, the marks and spaces consist of pits and lands, the pits being molded or embossed on the surface of substrate 2 representing the data layer 3. On the data layer 3 a first dielectric layer 5 is arranged and on the dielectric layer 5 a nonlinear layer 4 is arranged for providing the function of a mask layer for utilizing a super-resolution effect. The nonlinear layer 4 is for example a mask layer comprising a super-resolution near-field structure (Super-RENS). The optical storage medium 1 is in particular an optical disc having a size similar to DVDs and CDs.

Above the nonlinear layer 4 a second dielectric layer 6 is disposed. As a further layer, a cover layer 7 is disposed on the second dielectric layer 5 as a protective layer. For reading the data of the data layer 3, a laser beam is applied in this embodiment from the top of the storage medium 1, penetrating first the cover layer 7. The first and second dielectric layers 5, 6 comprise for example the material $ZnS$—$SiO_2$. The substrate 2 and the cover layer 7 may consist of a plastic material, as known from DVDs and CDs. In other embodiments, the reflective metallic layer may be omitted, when a super-resolution near field structure is used, which does not provide an increase in transmittance due to a heating effect, but works with another nonlinear effect, for example utilizes an effect providing an increased reflectivity of the nonlinear layer 4 when irradiated with a laser beam. The layers of the storage medium 1 are arranged in particular as a layer stack.

With the super-resolution effect, the resolution of a pickup can be increased in track direction by a considerable amount, for example by a factor of two to four. This allows a reduction of the size of the marks and spaces of the tracks on the optical disc in track direction. But the super-resolution effect as such does not allow to reduce the track pitch below the optical resolution limit of a corresponding pickup for reading of the data. If a push-pull effect is used for the tracking regulation of the pickup, the reduction of the track pitch is limited by the fact that the first order refracted beams have to be collected by the objective lens of the pickup. Otherwise there is no push-pull signal, because this signal is generated by the interference of the $0^{th}$ order and the $1^{st}$ order beams as reflected from the optical storage medium. For a Blu-Ray pickup, this occurs at a track pitch of about 280 nm. The standard track pitch of a Blu-Ray disc is 320 nm.

To overcome this problem, between neighboring tracks alternatingly a groove section or a land section without a groove is arranged on the optical storage medium 1. The tracks are arranged in particular as one or several spirals on the optical discs, with the result that between neighboring tracks always either a groove section or a land section is arranged. The storage medium has in a radial direction therefore a consecutive sequence of alternatingly a track, a groove section, a track, a land section, a track, a groove section and so on.

The track pitch between neighboring tracks can be reduced then below the optical resolution limit by still maintaining the distance between the groove sections being above the optical resolution limit of a pickup for reading of the data as stored in the tracks. Groove sections and land sections do not contain any digital data. Then a push-pull method for tracking of the pickup can be used, which is based on reflected light coming from the groove sections only. The reflected light coming from the marks or pits of the tracks do not contribute to the tracking error signal.

Figures 2, 3:
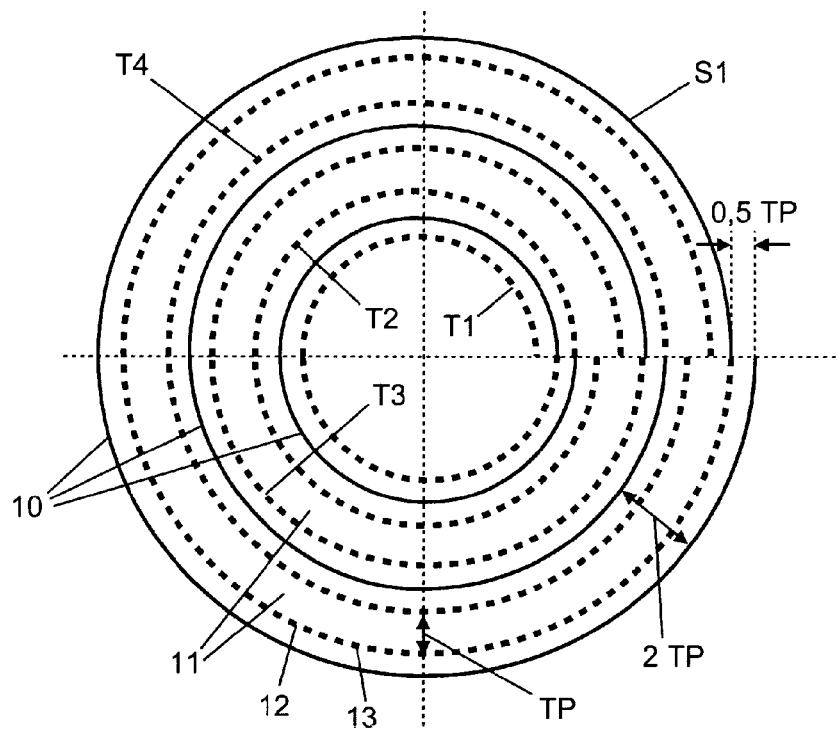

A first embodiment of a track arrangement of this kind is shown in FIG. 2, which shows in a simplified manner the arrangement of the tracks containing data, the groove sections and the land sections on the optical storage medium 1. The optical storage medium is in particular an optical disc and comprises a single spiral S1 in the embodiment of FIG. 2, which contains in the direction of the spiral, in tangential direction of the disc, a consecutive sequence of a track section, a groove section, a track section, a land section, and so on. The spiral S1 starts in an inner region of the optical disc with a first track T1, which is followed after a revolution of 360° by a groove section 10, followed after one revolution by a second track T2, and followed by a first land section 11.

This sequence of tracks, groove and land sections is continuously repeated as indicated in FIG. 2: after the first land section 11 the next track T3 follows having a length in accordance with the circumference of 360°, after which a further groove section 10 follows, which is replaced after one revolution by a further track T4, which is replaced after a further revolution by a land section, and so on. The spiral S1 is therefore composed such, that between neighboring tracks containing data alternatingly a groove section 10 or a land section 11 is arranged.

The spiral S1 starts in an inner region of the optical disc with the first track T1, as shown in FIG. 2. Alternatively, the spiral S1 starts in an inner region of the optical disc with a first groove section, which is followed after a revolution of 360° by track T1, followed after one revolution by a first land section, followed by a second track T2, and so on (not shown).

The optical storage medium 1 may be designed for example for operation with an apparatus comprising a pickup with a Blu-Ray type optics providing a laser beam with a wavelength $\Lambda=405$ nm and having a numerical aperture NA=0,85. The track pitch TP between neighboring tracks is for example 240 nm, being below the diffraction limit of the pickup, and the distance 2 TP between neighboring grooves is 480 nm, which is above the diffraction limit. The push-pull amplitude then mainly depends on the groove depth and the distance 2 TP between the grooves, and the HF data signal depends essentially on the width and the depth of the pits of a respective track. The push-pull signal is therefore not affected by the pit structure because advantageously the track pitch TP is below the diffraction limit. The HF signal and the tracking error signal can be optimized therefore independently of each other.

The optical storage medium as shown and explained with regard to FIGS. 1 and 2 is in particular a read-only storage medium having a mark/space data structure being provided as pits 12 and lands 13 along the tracks T1-T4 and further subsequent tracks of the spiral S1. The depth and width of the pits is optimized for providing a sufficiently large HF-signal, and the groove sections 10 have a depth and a width optimized for providing a tracking signal with sufficiently high amplitude. The read-only storage medium may have alternatingly also an inversed pit structure and groove structure, in which the pits are arranged as bumps, and correspondingly also the grooves being arranged as walls, as known from prior art. The distance 2 TP between two neighboring grooves 10 is in particular two times the distance between two neighboring tracks, track pitch TP, for example between neighboring tracks T3, T4.

The pickup of the apparatus is designed in a preferred embodiment for providing a center beam for reading the data of a track and providing two satellite beams, one satellite beam being adjusted to the neighboring groove section and the other being adjusted to the neighboring land section of the track, when the center beam is on track. The tracking error signal is then provided by the satellite beams by using a new differential push-pull tracking method, as described below. The center beam is used only for providing the HF data signal and a focus error signal for a focus adjustment of the pickup.

In FIG. 3 a table is shown for illustrating three embodiments for the track structure, groove sections and land sections as shown in FIG. 2. For the first embodiment, the pit-to-pit track pitch TP is 200 nm, and the groove-to-groove track pitch 2 TP is 400 nm. In the radial direction a consecutive sequence of pits with a width of 60 nm, groove section of width 60 nm and pits of width 60 nm is arranged, which are each separated by a land of 40 nm width. Then follows a land section of 140 nm, after which follows a track with pits of each 60 nm width, a groove section and a track with pits, separated each by 40 nm land, and so on.

For the second embodiment, the pit-to-pit track pitch is 240 nm, and the groove-to-groove track pitch is 480 nm. Pits and grooves can then be designed with a larger width, in this embodiment 72 nm, which are each separated by land of 48 nm. For the remaining land section then results a width of 168 nm. For the third embodiment, the pit-to-pit track pitch is 280 nm, and the groove-to-groove track pitch is 560 nm. For the pit width and the groove width then 84 nm is used with pits separated from the neighboring groove by 56 nm land, and by including a land section having a width of 196 nm. For each of the embodiments, therefore the pit-to-pit track pitch is below or at least at the diffraction limit of a Blu-Ray type pickup, which is about 280 nm.

A stamper for an optical disc in accordance with the embodiment shown in FIG. 2 can be mastered by using the following subsequent steps: mastering one track with data, e.g. pits and lands, mastering one track with a groove, mastering one track with data, and turning the disc one revolution with the mastering beam being switched off for generating a land section. For the mastering, a laser beam or an electron beam may be used. A constant radial feed of 0,5 TP for each rotation is used to provide a single spiral comprising a continuous sequence with a data track, groove section, data track, and land section as shown in FIG. 2. For example, when a track pitch TP of 240 nm is used for the distance between neighboring data tracks, the radial feed for the mastering beam is 120 nm per revolution.

The mastering parameters for the pits and the grooves may have the same values. Alternatively, the mastering parameters for the pits, in particular the width and the depth, and the mastering parameters for the grooves may be adjusted independently to optimize the push-pull signal and to optimize the HF-signal. This can be easily provided when using an electron beam as the mastering beam by controlling the width and the intensity of the beam.

The widths of the pits and grooves and the respective distances between pits and grooves can be adjusted as shown in the table of FIG. 3. The pits and the grooves need a sufficient width to generate sufficiently large amplitudes for the HF-signal and for the push-pull signal. This limits the reduction of the track pitch TP. The smallest track pitch, which may be useful in combination with a Blu-Ray pickup will be correspondingly between 160 nm and 200 nm. Between neighboring pits and grooves in addition a sufficiently large land area is required, as indicated in the table.

The apparatus for reading of data of an optical disc in accordance with the FIG. 2 uses in particular a three beam optical pickup, providing a center beam for reading of the data tracks and providing two satellite beams, as described before. For the satellite beams, a lower laser power can be selected with regard to the laser power of the center beam, because no super-resolution effect is required for generating the tracking signal. Therefore, a conventional differential push-pull grating can be used within the pickup to generate the three beams, wherein the satellite beams have a lower power than the center beam, and wherein the radial distance between the first satellite beam and the center beam and the radial distance between the center beam and the second satellite beam is each 0,5 TP.

The tracking of such a pickup is explained now with regard to FIGS. 4 and 5 for an optical disc in accordance with FIG. 2. As shown in FIG. 4a, the center beam CB is adjusted to track T2, satellite beam SB1 to land section 11 and satellite beam SB2 to groove section 10. The radial feed for the pickup for one revolution is 0,5 TP, when reading the data of the track T2. The situation when the center beam CB is adjusted to the track T3 for reading of the data of track T3 is shown in FIG. 4b.

At the end of the track T2, a radial jump is required for the pickup, to continue with reading the data of the next track T3, as indicated by arrows A1, A2, A3 in FIG. 5. In addition, the polarity of the push-pull signal is inverted for track T3, because the left satellite beam SB2 follows now a land section 11 and the right satellite beam SB1 follows a groove section 10, as shown in FIG. 4b. The sign of the push-pull signal has to be inverted therefore for tracking the pickup on track T3. After each rotation, a radial jump of the pickup has to be performed and the push-pull polarity has to be inverted correspondingly. For generating the push-pull signal, only the signals of the satellite beams SB1 and SB2 are utilized.

Figure 6:
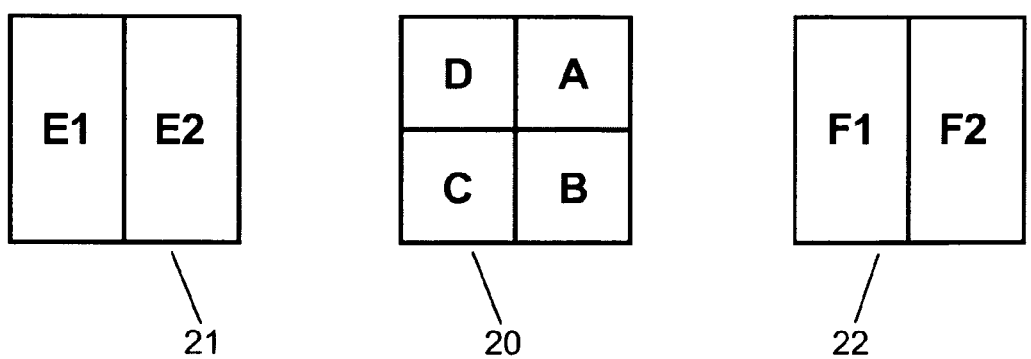

A detector unit, which can be used advantageously for the three beam tracking method for providing a differential push-pull tracking signal as described above, as well as for providing a data signal and a focus error signal, is shown in FIG. 6. The detector unit comprises a quadrant detector 20 with four segments A, B, C, D for detecting light from the center beam CB as reflected from the optical storage medium. For the satellite beam SB1 a second detector 21 is provided and for the satellite beam SB2 a third detector 22, which are each split into two halves with regard to the radial direction of the optical storage medium. Detector 21 is split into two equal segments E1, E2 and detector 22 into two equal segments F1, F2 and the geometrical arrangement of the detectors 20-22 inside the pickup is made such that the reflected light from the main beam is centered on detector 20, reflected light from satellite beam SB1 centered on detector 21 and reflected light from the satellite beam SB2 centered on detector 22, when the main beam is located exactly on a data track.

The segments A-F2 are photosensitive elements as known from prior art. The segments E1, E2, F1, F2 provide corresponding electrical signals e1, e2, f1, f2, from which a differential push-pull tracking signal TE for correcting the tracking error of the pickup can be calculated according to the following formula:

$$TE=(e2-e1)-(f2-f1)$$

Signal e2 is subtracted with e1 and signal f2 with f1, to keep the main beam on track. First, for each detector (21,22) the difference signal (e2−e1) and (f2−f1) has to be calculated. Then, from the difference signal e2−e1 of detector 22 the signal f2−f1 of detector 21 has to be subtracted, because they provide signals of different polarity, in dependency whether satellite beam SB1 is located on a groove section or a land section, and correspondingly satellite beam SB2 located on a land section or a groove section. The four segments A-D are used to provide the HF data signal and the focus error signal for focus regulation. When the segments E1, E2, F1, F2 have the same size and same light efficiency, and the intensity is the same for both satellite beams SB1, SB2, no correction factors are required for calculating the tracking signal TE.

Figure 7:
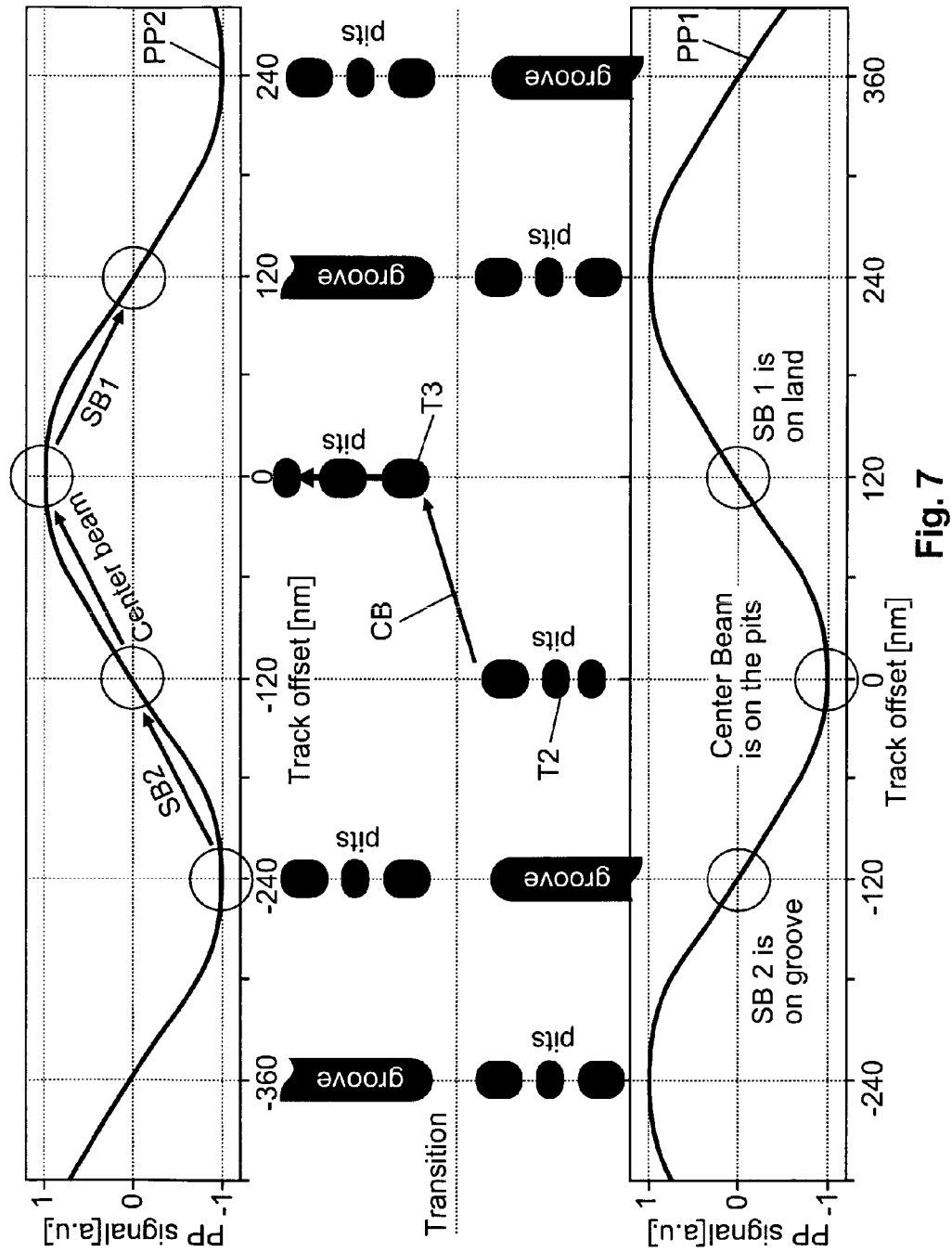

The switching of the polarity of the tracking signal, when shifting from one track to the next track, for example when shifting from track T2 to track T3 as explained with regard to FIGS. 4, 5, is sufficient for the center beam to follow the correct path. This can be demonstrated with regard to FIG. 7, which shows that the center beam CB moves from track T2 to track T3, as indicated by the arrows. The push-pull signal PP1 is the tracking signal when the center beam CB is moving along the track T2. When the center beam CB is centered on track T2, the satellite beam SB1 is located on a land section and satellite beam SB2 on a groove section and the push-pull signals of each of the detectors 21, 22 are zero.

The satellite beam SB1 moves ahead of the center beam CB and when the center beam CB has reached the end of track T2, the satellite beam SB1 is located already on track T3. This provides a track offset of −0,25 TP because the push-pull signal shifts by 0,25 TP at the transition from track T2 to track T3. The push-pull signal PP2, which is the tracking signal when the center beam CB is moving along the track T3, is shown in the upper part of FIG. 7. Thus, the push-pull signal of satellite beam SB1 moves the pickup already into the direction of the next track T3, shortly before the center beam CB reaches the end of track T2.

At the transition from track T2 to T3, the tracking signal shifts to the right by 0,25 track pitch, for example 120 nm, and the sign of the push-pull signal PP2 is inverted with regard to signal PP1. The satellite beam SB1 is pushed to the right until it reaches the zero crossing point with negative slope at 120 nm track offset of the push-pull signal PP2. The satellite beam SB2 and the center beam CB move also to the right, as indicated by the arrows in FIG. 7. After the center beam CB has reached track T3, the satellite beam SB1 is located on a groove section and the satellite beam SB2 on a land section and the track servo circuit will regulate the actuator until the push-pull signals of each of the satellite beams SB1 and SB2 will be zero, and the center beam CB will be regulated therefore to this new position centered on track T3.

The end of track T2 may be indicated to the tracking regulation of the apparatus in advance, for example by a special information pattern of pits at the end of track T2, to indicate that a transition to the next track is required. Also, the first pits of track T3 cannot be used because the tracking regulation requires some time for adjusting the pickup to the new track. The polarity of the push-pull signal can be inverted also for example in response to the information pattern.

The transition from track T2 to T3 can be improved, if the track T2 is slightly bent into the direction of the track T3 before the transition and when the track T3 is slightly bent into the direction of track T2 at the beginning of track T3. This will force the pickup to move already into the direction of track T3 shortly before the track jump, and the pickup will adjust faster to the new location for reading data of the track T3. Alternatively, or additionally, a small voltage pulse of correct sign may be applied to the tracking actuator coil at the end of track T2, shortly before the track transition, to shift the pickup into the direction of track T3.

Figure 8A:
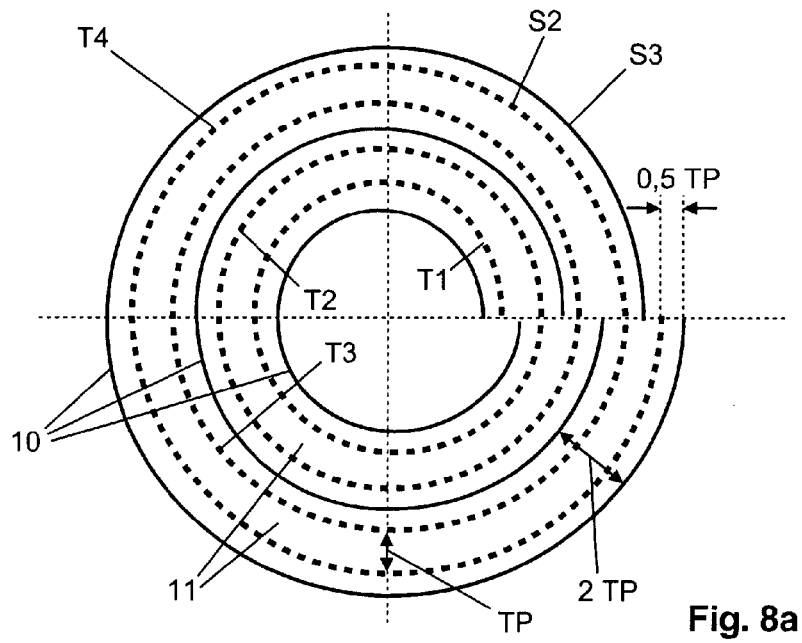

An optical storage medium according to a second embodiment comprises two spirals S2, S3, as shown in FIG. 8a. The spiral S2 is designed for comprising a continuous sequence of marks and spaces, for example of pits and lands in case of a read-only optical disc. The second spiral S3 contains a continuous sequence of alternatingly a groove section 10 and a land section 11, wherein each groove section and each land section has a length corresponding to the circumference of 360° of the disc and each groove section 10 is alternatingly followed by a land section 11 and each land section 11 followed by a groove section 10 after one revolution of the disc. The spirals S2 and S3 are interleaved with each other to provide alternatingly in radial direction of the disc a continuous sequence of a track, a groove section, a track and a land section, for example a track T1, a land section 11, a track T2, a groove section 10, a track T3, a land section 11, a track T4, and so on. The distance 2 TP between two neighboring groove sections 10 is in particular twice the track pitch TP between two neighboring tracks, in correspondence with the embodiment of FIG. 2.

When reading data from an optical disc according to the second embodiment, the center beam of the optical pickup moves continuously along a track without any jump, in accordance with the radial feed as necessary to follow the spiral S2. The spiral S2 begins for example in the center of the disc and ends at the outside of the disc. For the tracking regulation, the polarity of the tracking signal has to be switched after each revolution, when the spiral S3 changes from groove section 10 to land section 11, and correspondingly from land section 11 to groove section 10.

Figure 8B:
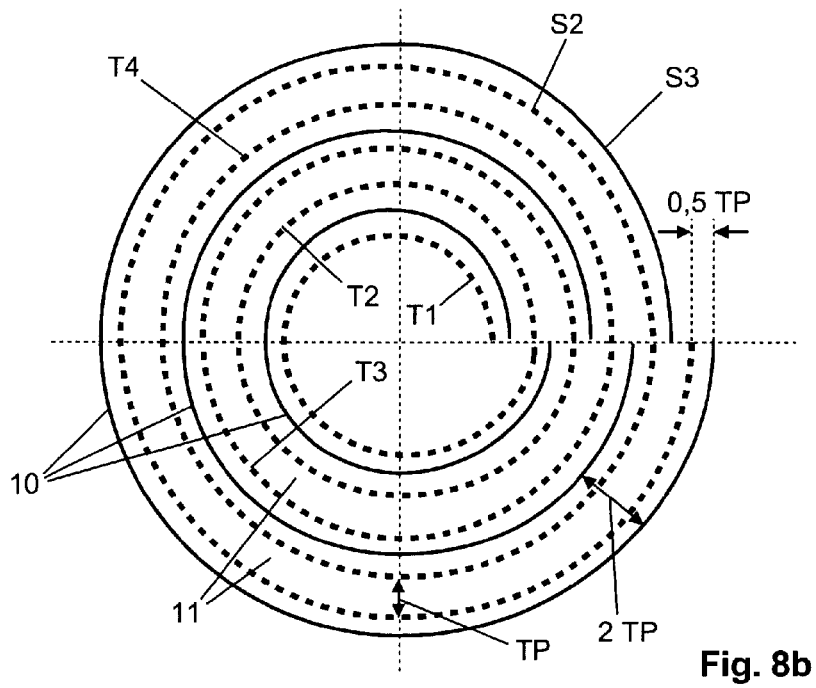

On the optical disc as shown in FIG. 8a, the innermost spiral is spiral S3, starting with a groove section 10. As an alternative, the innermost spiral is spiral S2, starting with track section T1, as shown in FIG. 8b.

Figure 9A:
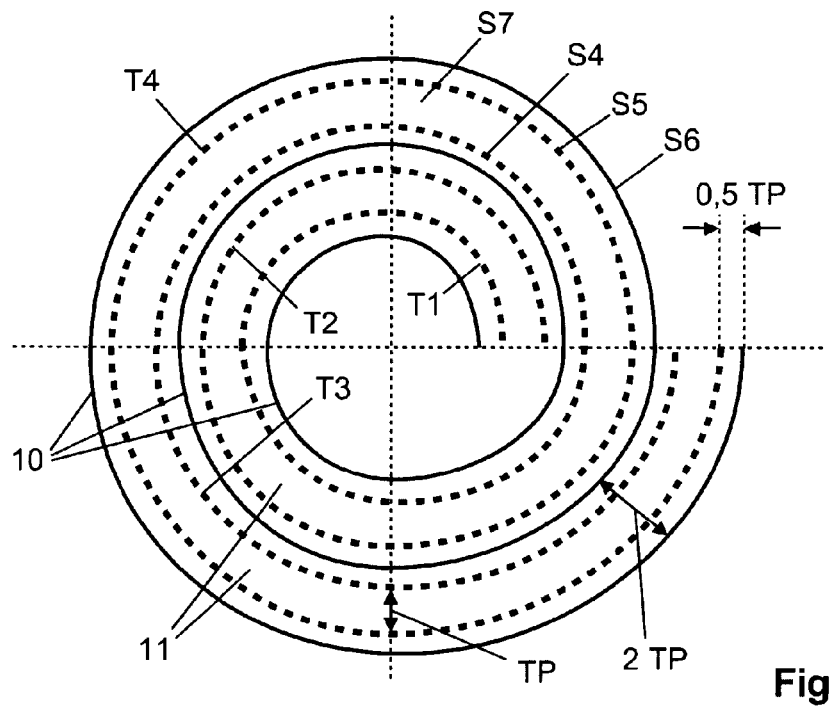

A third embodiment shown in FIG. 9a comprises four spirals S4-S7. The spirals S4 and S5 are separated by a track pitch TP and contain each a continuous sequence of data with marks and spaces, for example pits and lands in case of a read-only optical disc. The third spiral S6 is a continuous groove section and the fourth spiral S7 a continuous land section 11. The four spirals S4-S7 are interleaved with each other such that the storage medium comprises in radial direction a track, a land section, a track and a groove section, e.g. a track section T1, a land section 11, a track T2, a groove section 10, a track T3, a land section 11, and so on.

For the embodiment of FIG. 9a, the apparatus has to determine, from which spiral S4 or S5 data have to be read and the center beam of the optical pickup has to be adjusted correspondingly on spiral S4 or spiral S5. Because both spirals S4, S5 consist of a continuous sequence of marks and spaces without any shift in radial direction, no jumps are required for the pickup. Spiral S4 or S5 can be selected for example by including a specific header at the beginning of each spiral S4, S5 or by evaluating the polarity of the tracking signal. Because spiral S6 consists of a continuous groove section and spiral S7 of a continuous land section, no polarity switching is required, when reading the data of spiral S4 or S5.

On the optical disc as shown in FIG. 9a, the innermost spiral is spiral S6, constituting the groove section 10. As an alternative, the innermost spiral is spiral S5, starting with track section T1, as shown in FIG. 9b.

A stamper for a production of an optical disc in accordance with the second embodiment of FIG. 8 can be mastered by using two mastering beams in parallel, one mastering beam arranged for writing tracks of spiral S2 comprising marks and spaces, or pits and lands, and the other mastering beam arranged for writing alternatively a groove section 10 or a land section 11 of spiral S3. The radial distance between the two mastering beams has to be 0,5 TP. For writing the tracks and groove sections and for providing the land sections, the same constant radial feed is used for both mastering beams. The radial feed has to be TP per revolution.

Figure 9B:
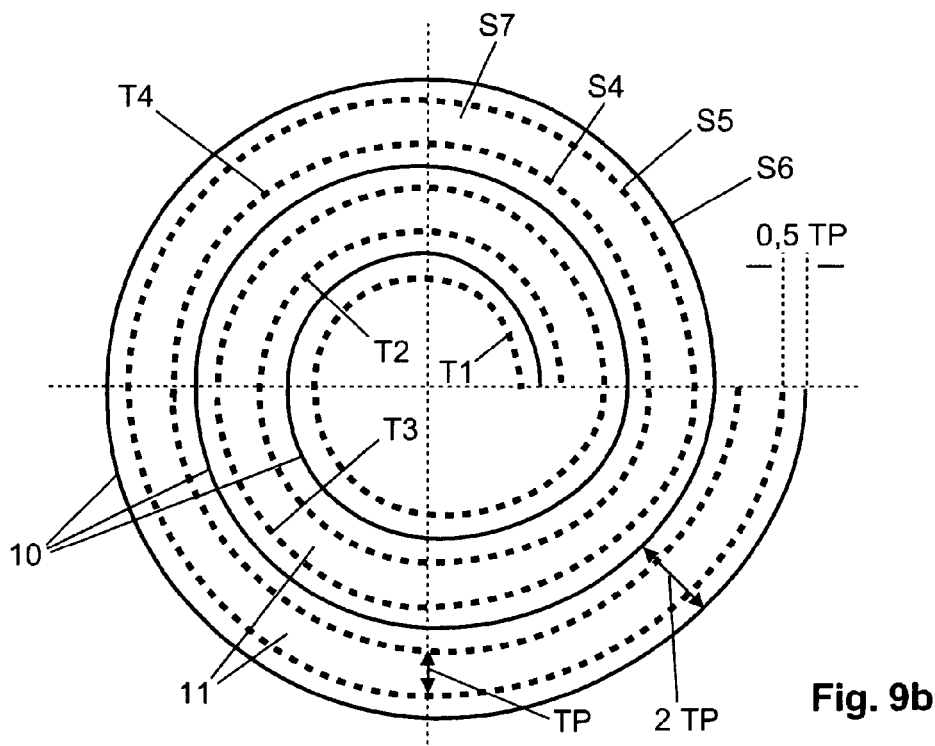

A stamper for a production of an optical disc in accordance with the third embodiment of FIGS. 9a, 9b can be mastered accordingly by using two mastering beams in parallel for providing two data tracks, spirals S4, S5 and a third mastering beam for providing a groove section, spiral S6. Spiral S7 is obtained by selecting a track pitch of TP between the first and the second mastering beam for providing a land section. The radial feed has to be 2 TP per revolution.

The track structures as shown in FIGS. 2, 8, 9 for reducing the track pitch can be applied advantageously to a Super-RENS optical disc, comprising a mask layer having a super resolution near field structure. The track pitch is in particular below 280 nm for use with an optical pickup having a semiconductor laser emitting light with a wavelength of e.g. about 405 nm. But also other embodiments may be utilized by a person skilled in the art without departing from the spirit and scope of the present invention. The track structures as shown in FIGS. 2, 8, 9 may be applied in particular also to any other optical disc not utilizing a nonlinear layer with a super-resolution structure, for a reduction of the track pitch. The invention may be used also not only for read-only (ROM) optical storage media, but also for writable and re-writable optical storage media. The invention resides therefore in the claims herein after appended.

The invention claimed is:
1. Optical storage medium comprising
a substrate layer,
a data layer having a mark/space data structure with data arranged in data tracks on the substrate layer, and
a nonlinear layer with a super-resolution structure arranged above the data layer,
wherein the optical storage medium is a read-only disc with the mark/space data structure provided as a pit/land structure, wherein
the optical storage medium comprises a region, in which in a radial direction of the disc a consecutive sequence of a data track, a groove section, a data track, a land section, a data track, and a groove section is alternately arranged, and wherein
the distance between marks of adjacent data tracks is below the diffraction limit of a pickup for reading of the data of the optical storage medium, and the distance between groove sections is above the diffraction limit of the pickup.

2. Optical storage medium according to claim 1, wherein the data tracks are arranged as one or several spirals on the substrate layer.

3. Optical storage medium according to claim 2, comprising a single spiral with consecutive sequences of a data track, a groove section a data track, and a land section.

4. Optical storage medium according to claim 3, wherein the length of each data track, groove section and land section is the same and corresponds with a circumference of 360°.

5. Optical storage medium according to claim 2, wherein the data tracks are arranged as a first spiral of continuous data, and the groove sections and the land sections are arranged as a second spiral comprising alternatingly in tangential direction a groove section and a land section, and wherein the two spirals are interleaved with each other to provide alternatingly in radial direction of the disc a data track, a groove section, a data track, and a land section.

6. Optical storage medium according to claim 5, wherein the length of each groove section and each land section of the second spiral are the same and correspond with a circumference of 360°.

7. Optical storage medium according to claim 2, wherein the data tracks are arranged as two spirals of continuous data, the groove sections as a third spiral and the land sections as a fourth spiral, and wherein the four spirals are interleaved with each other to provide alternatingly in radial direction of the disc a data track, a groove section, a data track, and a land section.

8. Optical storage medium according to claim 1, wherein the distance between marks of adjacent data tracks is below 290nm, and the distance between groove sections is above 380nm.

9. Optical storage medium according to claim 1, wherein the distance between neighboring groove sections is twice the distance between neighboring tracks.

10. Method for mastering a stamper for an optical storage medium in accordance with claim 4, wherein a mastering beam is used with one electron beam or one laser beam, by comprising the following steps:
  mastering one data track, representing pits, and after one revolution, switching the electron or laser beam constantly on for mastering one track with a groove, after a further revolution, mastering one data track with pits, after a further revolution, keeping the laser or electron beam switched off, for providing a land section, after a further revolution, mastering one data track with pits, and so on, for writing a single spiral having data track, groove, data track, and land section alternatingly within the spiral.

11. Method for mastering a stamper for an optical storage medium in accordance with claim 6, wherein a mastering is used with two electron beams or two laser beams, by comprising the following step:
  a first of the beams is used for writing the mark/space data structure of the first spiral and
  simultaneously the second beam is used for writing the land/groove structures of the second spiral.

12. Method for mastering a stamper for an optical storage medium in accordance with claim 8, wherein a mastering is used with three electron beams or three laser beams, by using the following steps:
  two of the beams are used for writing simultaneously the mark/space data structures of the first and the second spirals, and
  simultaneously the second beam is used for writing the groove structure of the third spiral.

13. Apparatus comprising a pickup with a laser, a detector unit and an objective lens for reading data from an optical storage medium in accordance with claim 1, the pickup providing a center beam for reading of data and two satellite beams for providing a tracking signal, the three beams being focused by the objective lens onto the optical storage medium, and reflected light from the optical storage medium being guided onto the detector unit.

14. The apparatus of claim 13, wherein the intensity of the two satellite beams (SB1, SB2) is each smaller than 50% of the intensity of the main beam.

15. The apparatus of claim 13, wherein the detector unit comprises a center detector for detecting reflected light from the center beam and two satellite detectors for detecting reflected light from the satellite beams, the two satellite detectors being divided each into two parts, and wherein the pickup provides a differential push-pull tracking signal according to the two satellite detectors for tracking regulation.

16. The apparatus of claim 15, wherein the tracking signal is calculated by taking into account the relation TE=(e1−e2)−(f1−f2), e1, e2, f1, f2 being electrical signals from the four parts.

17. The apparatus of claim 13, wherein the detector unit is designed such, that the two satellite beams have a track offset of approximately ½ track pitch with regard to the main beam.

* * * * *